United States Patent
Wang et al.

(10) Patent No.: US 11,143,027 B2
(45) Date of Patent: Oct. 12, 2021

(54) RECTANGULAR WORKING WELL WITH PRESET PIPE JACKING HOLE AND SLIDING BACK WALL IN WATER-RICH STRATUM AND CONSTRUCTION METHOD THEREOF

(71) Applicants: Infrastructure Renewal Institute of Southern China, Guangdong (CN); WELEAD Infrastructure Engineering Technology (Zhengzhou), Ltd., Henan (CN)

(72) Inventors: Fuming Wang, Guangdong (CN); Hongyuan Fang, Guangdong (CN); Yanhui Pan, Henan (CN); Peng Zhao, Henan (CN); Chengchao Guo, Henan (CN)

(73) Assignees: Infrastructure Renewal Institute of Southern China, Guangdong (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 0 days.

(21) Appl. No.: 16/856,057

(22) Filed: Apr. 23, 2020

(65) Prior Publication Data

US 2020/0248551 A1     Aug. 6, 2020

(30) Foreign Application Priority Data

Aug. 8, 2019    (CN) .......................... 201910731641.7

(51) Int. Cl.
*E21D 5/01*       (2006.01)
*E02D 23/08*     (2006.01)
(Continued)

(52) U.S. Cl.
CPC ............... *E21D 5/01* (2013.01); *E02D 23/08* (2013.01); *E21D 9/005* (2013.01); *F16L 55/165* (2013.01); *F16L 55/18* (2013.01)

(58) Field of Classification Search
CPC .......... E21D 5/01; E21D 9/005; E02D 23/00; E02D 23/08; F16L 1/036; F16L 55/165; F16L 55/1657; F16L 55/1658; F16L 55/18
(Continued)

(56) References Cited

U.S. PATENT DOCUMENTS 3,994,139 A  *   11/1976   Foik ...................... E02D 17/086
                                                                                              405/157
4,059,965 A  *   11/1977   Stuckmann ............... E03F 3/06
                                                                                              405/184.5
(Continued)

FOREIGN PATENT DOCUMENTS

CN        205276324 U  *   6/2016
CN        110485465 A  *   11/2019
(Continued)

*Primary Examiner* — Frederick L Lagman

(57) ABSTRACT

A construction method of a rectangular working well includes steps of: (I) designing functional requirements for the rectangular working well; (II) constructing a caisson of an enclosing structure of the rectangular working well; (III) constructing an edge protector; (IV) excavating earthwork of the rectangular working well; (V) forming a bottom cover for the rectangular working well, and pre-embedding a sliding track, a pull ring and a back wall anchor; (VI) installing a ladder for entering the rectangular working well; (VII) preventing joint leakage; (VIII) installing a waterproof pressure plate at an entrance of the preset pipe jacking hole; (IX) constructing the sliding back wall; (X) lifting the sandwich concrete slab wall at a top of the preset pipe jacking hole; and (XI) performing pipe jacking. The struc- (Continued)

ture system constructed by the present invention has many advantages such as clear function, safety, quickness, and flexible design.

8 Claims, 6 Drawing Sheets

(51) Int. Cl.
*F16L 55/165* (2006.01)
*F16L 55/18* (2006.01)
*E21D 9/00* (2006.01)

(58) Field of Classification Search
USPC .................... 405/157, 184.1, 184.2, 184.3
See application file for complete search history.

(56) References Cited

U.S. PATENT DOCUMENTS

| | | | | |
|---|---|---|---|---|
| 4,116,011 A * | 9/1978 | Girault | ................ | E21D 9/005 |
| | | | | 405/134 |
| 4,507,019 A * | 3/1985 | Thompson | ............ | E21B 7/046 |
| | | | | 138/97 |
| 4,630,967 A * | 12/1986 | Soltau | .................. | E21B 7/201 |
| | | | | 405/143 |
| 4,925,344 A * | 5/1990 | Peres | ..................... | E21B 7/20 |
| | | | | 166/55 |
| 5,205,671 A * | 4/1993 | Handford | ................ | E21B 7/30 |
| | | | | 175/62 |
| 5,980,157 A * | 11/1999 | Puttman | ................. | E21B 7/205 |
| | | | | 175/22 |
| 6,244,783 B1 * | 6/2001 | Puttmann | ............... | E21B 7/30 |
| | | | | 405/156 |
| 6,357,967 B1 * | 3/2002 | Putnam | ............ | F16L 55/1658 |
| | | | | 254/29 R |
| 6,491,476 B2 * | 12/2002 | Hesse | ..................... | E21B 7/30 |
| | | | | 405/184 |
| 8,393,828 B1 * | 3/2013 | Vidovic | ................ | E21D 9/124 |
| | | | | 405/138 |
| 2005/0111919 A1 * | 5/2005 | Wentworth | ........ | F16L 55/1658 |
| | | | | 405/184.3 |
| 2010/0296876 A1 * | 11/2010 | Ding | ...................... | E02D 23/00 |
| | | | | 405/249 |
| 2019/0249800 A1 * | 8/2019 | Zillante | ................. | E21B 7/201 |

FOREIGN PATENT DOCUMENTS

| | | | | |
|---|---|---|---|---|
| CN | 110485468 A | * | 11/2019 | |
| JP | 60184126 A | * | 9/1985 | ............ E02D 23/08 |

* cited by examiner

RECTANGULAR WORKING WELL WITH PRESET PIPE JACKING HOLE AND SLIDING BACK WALL IN WATER-RICH STRATUM AND CONSTRUCTION METHOD THEREOF

CROSS REFERENCE OF RELATED APPLICATION

The present invention claims priority under 35 U.S.C. 119(a-d) to CN 201910731641.7, filed Aug. 8, 2019.

BACKGROUND OF THE PRESENT INVENTION

Field of Invention

The present invention relates to a technical field of non-excavation construction and repair of underground pipelines for water conservancy, municipal, thermal, communication and other infrastructure, and more particularly to a rectangular working well with a preset pipe jacking hole and a sliding back wall in a water-rich stratum and a construction method thereof for non-excavation construction and repair of underground pipelines for water conservancy, municipal, thermal, communication and other infrastructure.

Description of Related Arts

With the accelerated process of urbanization, not only a large number of underground infrastructure facilities need to be built, but also a large number of old underground pipelines need to be rectified and upgraded, resulting in very complicated urban road underground pipeline networks, wherein road collapse and safety accidents caused by underground pipeline damage are frequent. Under the circumstance that traffic requirements and green environmental protection concepts are increasingly valued, conventional excavation and landfill construction not only has low construction efficiency, but also faces serious post-construction settlement, which is mostly used for shallow buried rainwater and sewage pipes in new urban areas. Non-excavation construction technologies such as directional drilling and pipe jacking have gradually become the mainstream technologies of urban underground pipelines. Among them, pipe jacking has attracted more and more attention from engineers due to flexible cross-section selection, large burial depth, effectively avoiding conflicts with above pipelines, and long-distance underground pipeline construction with corresponding working wells, receiving wells and intermediate intervals in only a small area. In addition, during rectification and upgrade of a large number of old pipeline networks in the old city, in the case of pipe jacking construction of small-section pipe gallery structures, it is urgent to add temporary working wells, and a certain number of permanent working wells are needed to ensure operation and maintenance of the underground pipelines. Conventionally, design and construction of the working wells, receiving wells and intermediate intervals mainly adopt sinking or inverted wells, which is safe and reliable, but has high cost, long construction period, and occasional instability accidents due to sinking difficulties, tilts and improper operations.

Especially in the southern cities of China, the rivers are dense and the groundwater level is high, and most of them belong to water-rich stratums. In order to save investment, working wells are generally used as permanent equipment maintenance wells. At the same time, the construction of working wells in water-rich stratums is a very difficult process, mainly reflected in possible adverse effects of groundwater in both the construction process and quality control. In addition, the most critical link is that drilling holes after the pipe jacking in the water-rich stratum is a very dangerous process, which takes a long time, is difficult to operate, needs a long construction period, and is easy to cause accidents such as piping, quicksand and surrounding collapse. Drilling multiple holes in one pipe jacking well is even more dangerous. It can be seen that seeking a safer and more reliable method of designing and constructing work wells and pipe jacks for water-rich stratums has become a major requirement for the further development of the industry.

SUMMARY OF THE PRESENT INVENTION

To satisfy development requirements of non-excavation construction and repair of underground pipelines for water conservancy, municipal, thermal, communication and other infrastructure to overcome defects of design and construction of conventional working wells in water-rich stratums, the present invention provides a rectangular working well with a preset pipe jacking hole and a sliding back wall in a water-rich stratum and a construction method thereof. The present invention is based on safety and use of rectangular working wells in water-rich stratums. It is the first time to innovatively propose and adopt a concept of simultaneous design and implementation of thin-walled plain concrete cavities for pipe jacking holes, sliding back walls, and pipe jacking working well structures. It is also the first time to introduce a design and construction technology of sandwich concrete slab wall in a working well structure system. The present invention can be used to safely and quickly complete construction of rectangular working wells required for non-excavation construction of underground pipelines for water conservancy, municipal, thermal, communication and other infrastructure. As a new method for the design and construction of the rectangular working wells required for the non-excavation construction of the underground pipelines for water conservancy, municipal, thermal, communication and other infrastructure, the present invention is not only safe, reliable and advanced in technological concepts, but also economically applicable.

Accordingly, the present invention provides:

a construction method of a rectangular working well with a preset pipe jacking hole and a sliding back wall in a water-rich stratum, comprising steps of:

(I) designing functional requirements for the rectangular working well, comprising steps of:

(1) collecting relevant data to determine a plane size, a depth, and a treatment method of a working well bottom cover, so as to satisfy well operation requirements;

(2) determining a height and a diameter of the preset pipe jacking hole according to a position, a diameter, a material and a connection method of a proposed pipeline, wherein a quantity of the preset pip jacking hole is at least one; and (3) calculating and drawing a structure of the rectangular working well: using comparative calculation analysis of a rod system element method and numerical simulation to obtain an optimal supporting structure composition of the rectangular working well, and then drawing to complete functional requirement design for the rectangular working well;

(II) constructing a caisson of an enclosing structure of the rectangular working well, comprising steps of:

(1) preparing before construction of the caisson: comprising site leveling, laying out, excavating earth of a first layer, compacting a foundation, leveling and laying out, inspecting lines, laying a sand cushion, forming cutting edge formwork, binding steel bars, forming well body formwork, pouring concrete, curing, and demoulding;

(2) constructing the caisson by sections: comprising preparing, installing a vertical transportation machinery and drainage pumps, observing, correcting, sinking to a designed elevation by sections, and verifying the elevation;

(3) setting a thin concrete wall having a cavity along a vertical axis where the preset pipe jacking hole is located during pouring the caisson by sections, and inserting a sandwich concrete slab wall into the thin concrete wall having the cavity; and (4) using reinforced concrete or steel members as a material of the enclosing structure of the rectangular working well, and performing anticorrosive measures;

(III) constructing an edge protector: setting embedded parts during construction the caisson of the enclosing structure of the rectangular working well, and connecting the edge protector and the embedded parts by bolts;

(IV) excavating earthwork of the rectangular working well: during construction of the caisson, directly excavating the earthwork above water, and excavating the earthwork below the water by high-pressure water gun loosening, hydraulic grabbing or reverse circulation pumping;

(V) forming a bottom cover for the rectangular working well, and pre-embedding a sliding track, a pull ring and a back wall anchor: in order to meet needs of subsequent construction, using concrete to treat the bottom cover of the rectangular working well; using plain concrete for anti-floating stability before connecting a caisson wall with reinforced concrete; simultaneously pre-embedding the sliding track, the pull ring and the back wall anchor during pouring the reinforced concrete bottom cover;

(VI) installing a ladder for entering the rectangular working well: according to needs of subsequent maintenance, designing the ladder which is installed on an internal wall of the rectangular working well by planting bars;

(VII) preventing joint leakage: using a polymer material for leakage control at joints of the rectangular working well and side walls of the caisson of the enclosing structure;

(VIII) installing a water-proof pressure plate at an entrance of the preset pipe jacking hole: fixing the water-proof pressure plate at the entrance through expansion bolts according to a position of the preset pipe jacking hole;

(IX) constructing the sliding back wall: according to a calculation result of a pipe jacking thrust, hoisting a prefabricated back wall, and fixing the back wall by the back wall anchor; installing a pull rod between the back wall anchor and the pull ring; for different pipe jacking positions, adjusting a position of the sliding back wall through the pull rod and starting pipe jacking again after fixing;

(X) lifting the sandwich concrete slab wall at a top of the preset pipe jacking hole: lifting the sandwich concrete slab wall to form the thin concrete wall having the cavity at the preset pipe jacking hole, so as to reduce a resistance when a pipe jacking machinery passes through the preset pipe jacking hole; and (XI) performing pipe jacking: after the pipe jacking machinery is installed in place, continuously passing through the thin concrete wall having the cavity at the preset pipe jacking hole under a hydraulic jacking thrust for normal pipe jacking construction.

The present invention also provides a rectangular working well with a preset pipe jacking hole and a sliding back wall in a water-rich stratum, comprising: the rectangular working well, wherein an enclosing structure of the rectangular working well is a caisson, a bottom cover is provided at a bottom of the rectangular working well, and the preset jacking hole is provided inside the rectangular working well and near the bottom; the sliding back wall is provided opposite to the preset jacking hole, a thin concrete wall having a cavity is provided in the caisson along a vertical axis of the preset jacking hole, and a sandwich concrete panel wall is inserted into the thin concrete wall having the cavity.

A water-proof pressure plate is fixed at an entrance of the preset pipe jacking hole by expansion bolts.

A pipe jacking machinery is provided in the rectangular working well; the pipe jacking machinery is docked with a pipe jack in a thrust direction, and the pipe jacking machinery pushes the pipe jack toward the preset pipe jacking hole.

A polymer material is used for leakage control at joints between the bottom cover and the caisson as well as joints at side walls of the caisson.

A connector is pre-embedded on the caisson; an edge protector is connected to a top end of the caisson, and the edge protector is connected to the pre-embedded connector by bolts.

A ladder is installed on an internal wall of the rectangular working well through planting bars.

A sliding track and a pull ring are pre-embedded on the bottom cover; the sliding back wall cooperates with the sliding track; the sliding back wall is connected to a pull rod through an anchor, and an end portion of the pull rod is connected to the pull ring.

Compared to prior art, technical effects of the present invention are as follows.

(1) The present invention is advanced in technological concepts. It is the first time to innovatively propose and adopt a concept of simultaneous design and implementation of thin-walled plain concrete cavities for pipe jacking holes, sliding back walls, and pipe jacking working well structures, which not only overcomes construction difficulties and safety risks of drilling holes after the pipe jacking in the water-rich stratum, but also saves corresponding capital investment. While providing underground safe operating spaces, it also shortens a construction period of the working well.

(2) It is also the first time to a sandwich concrete slab wall structure in the enclosing structure. Together with the reinforced concrete caisson, the working well enclosing structure is formed, which can effectively exert mechanical properties of the material and ensure functions of the working well. With hydraulic thrust of the pipe jacking machinery, the pipe jacking hole can be easily opened, which is safe and fast.

(3) The polymer material is used to deal with the leakage and potential leakage in advance, which effectively guarantees subsequent safe use of the rectangular pipe jacking working well.

(4) The unique design concept of the rectangular pipe jacking working well structure with the preset pipe jacking hole and an opening method of the hole provide a set of safe and reliable standardized implementation technology for pipe jacking in water-rich areas. The sliding back wall and the preset multiple pipe jacking holes can realize single-well multi-directional pipe jacking construction, which is safe, reliable, economical and applicable, and reduces a construction impact on surrounding environment.

The rectangular working well structure of the present invention is significantly different from conventional working well technology in terms of design and construction concepts, structural system forces, construction methods, target orientation, comprehensive utilization value, and other aspects, which is safe, fast, technically advanced, efficient in recycling, green and economical, ecological harmony, etc. The present invention has been successfully applied to construction of rectangular working wells in water-rich stratums, and development prospects are considerable.

DETAILED DESCRIPTION OF THE PREFERRED EMBODIMENT

Figure 1:
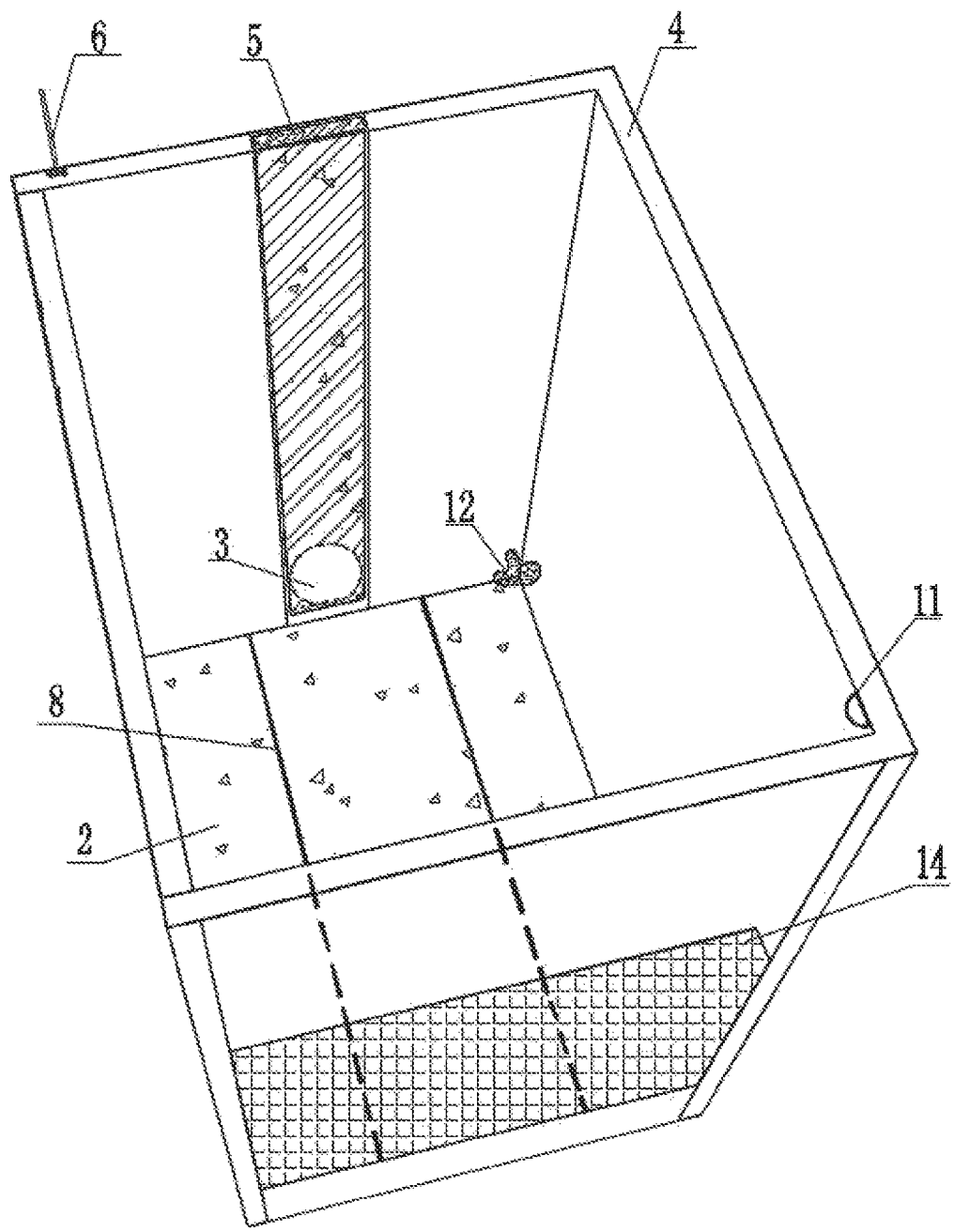
FIG. 1 is a perspective view of the present invention.
Figure 2:
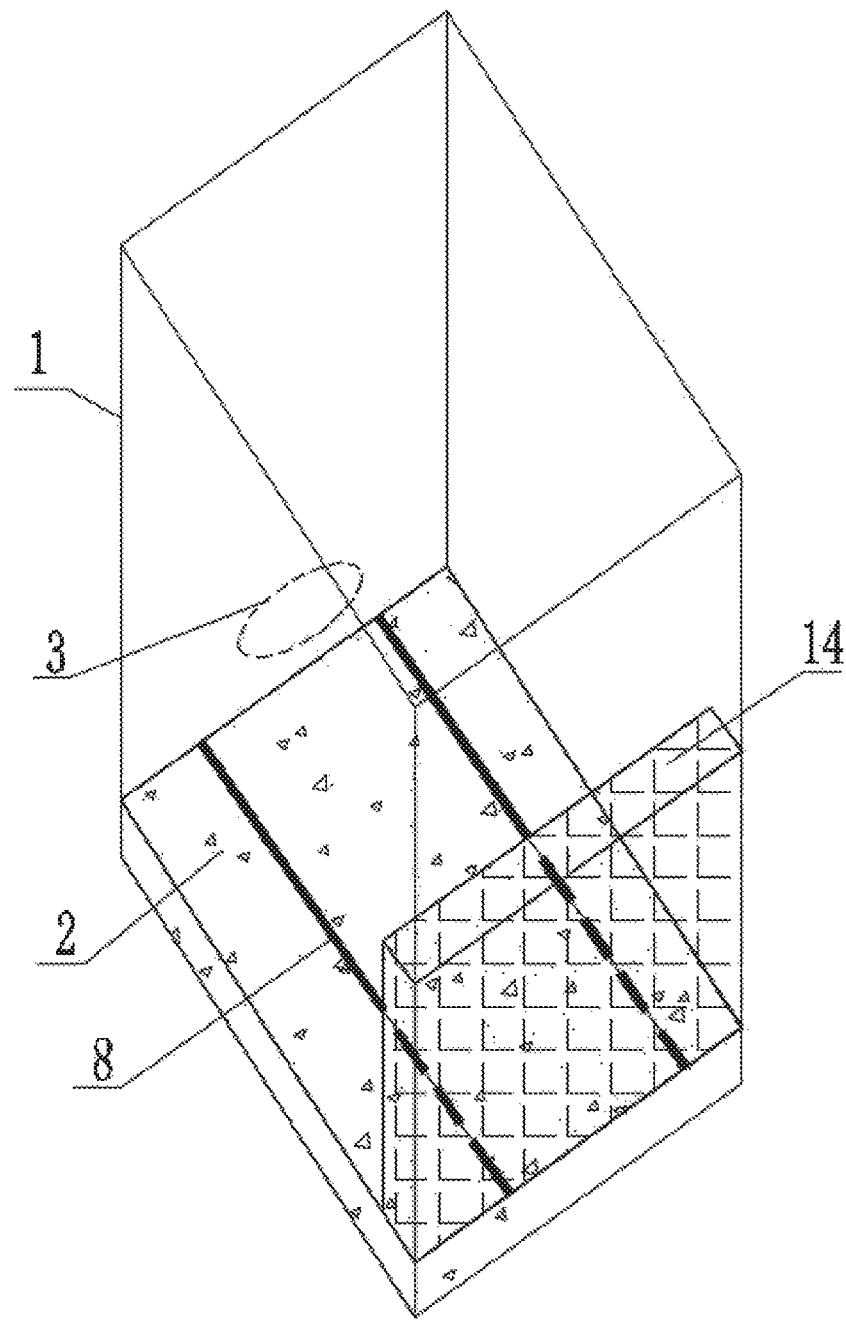
FIG. 2 is a functional structure view of a rectangular working well according to the present invention.
Figure 3:
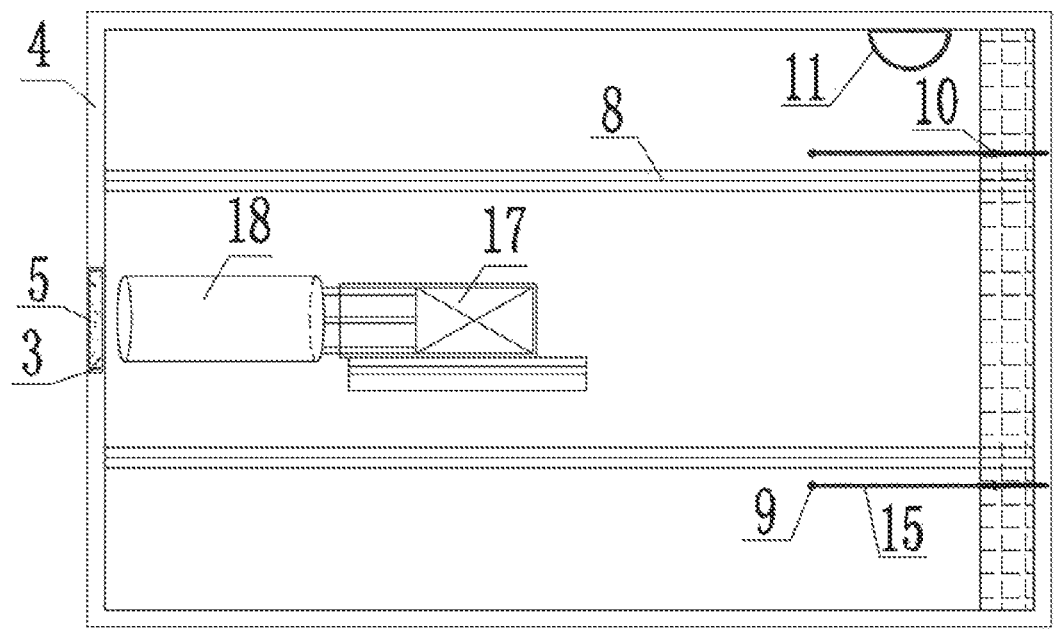
FIG. 3 is a plan layout of the rectangular working well according to the present invention.
Figure 4:
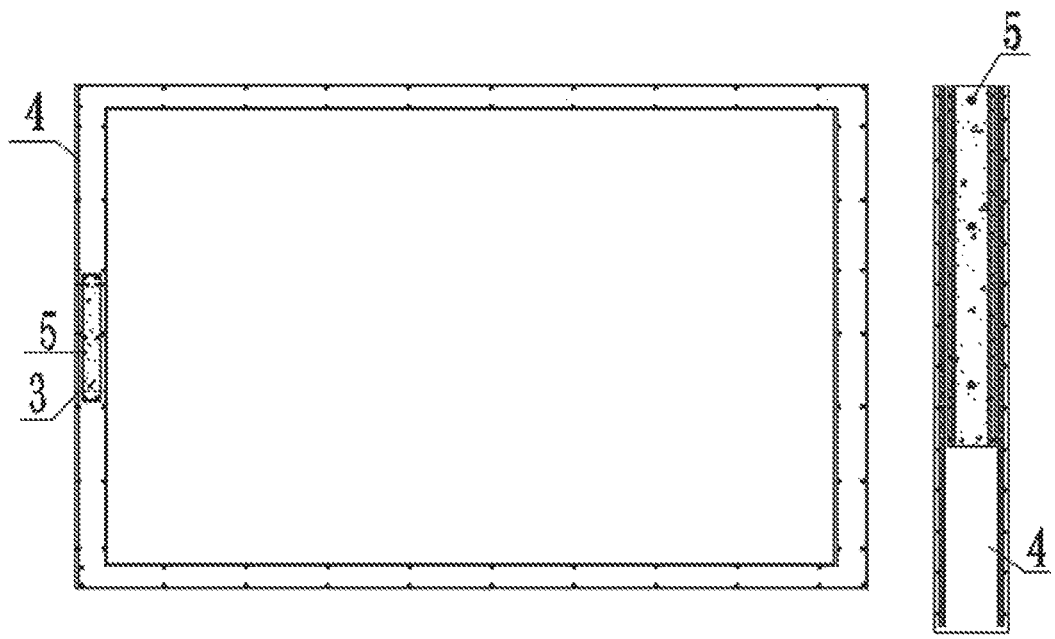
FIG. 4 is a structural view of a caisson and a sandwich concrete slab wall according to the present invention.
Figure 5:
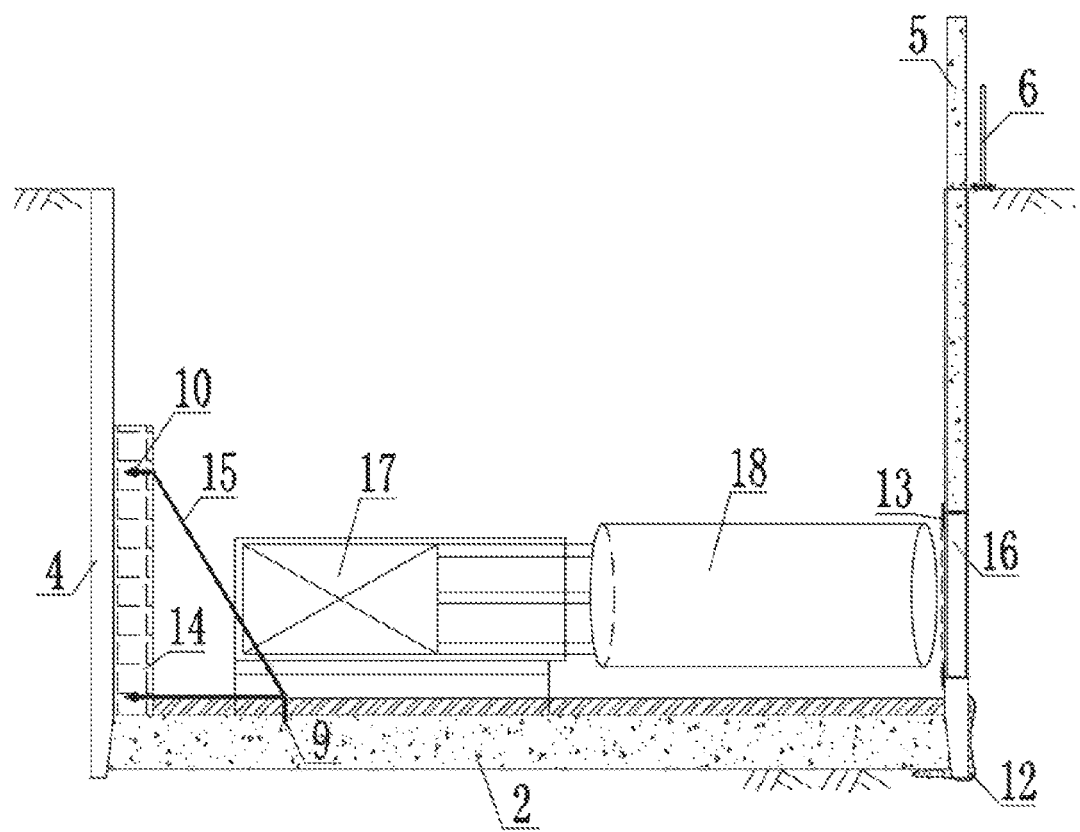
FIG. 5 is a sectional structure view of the rectangular working well according to the present invention.
Figure 6:
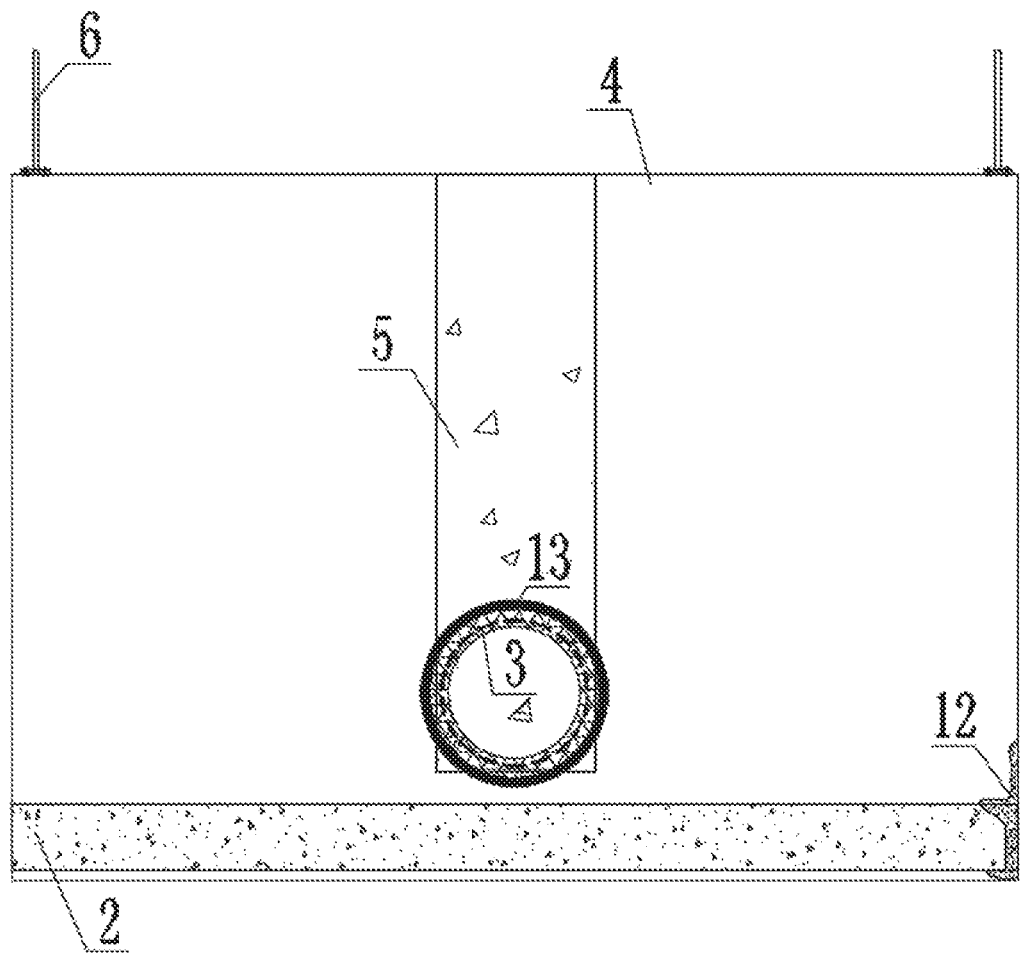
FIG. 6 is an enlarged view of a caisson structure of the present invention.
Figure 7:
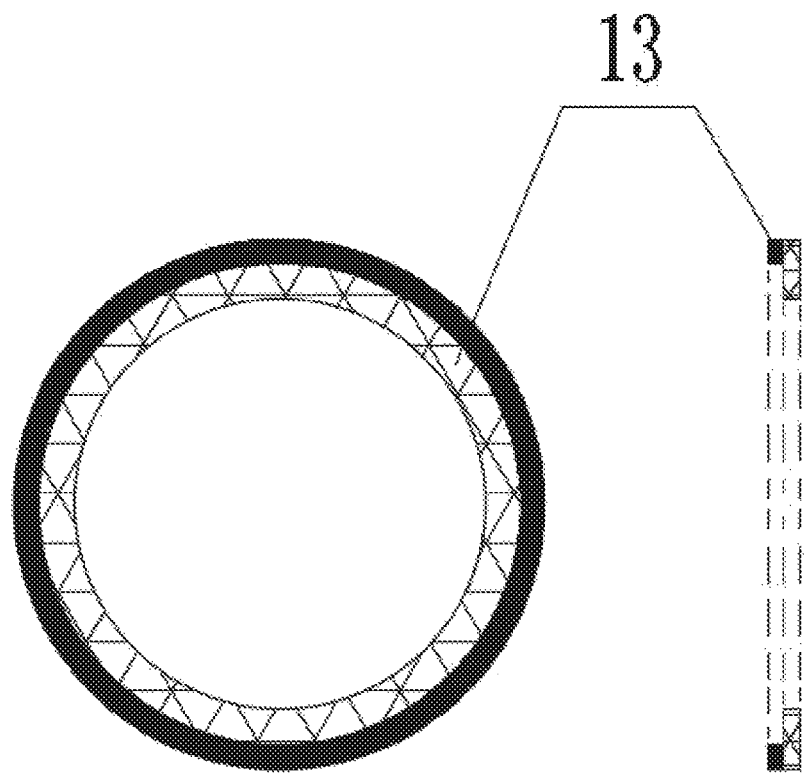
FIG. 7 is a structure view of a water-proof pressure plate according to the present invention.
Figure 8:
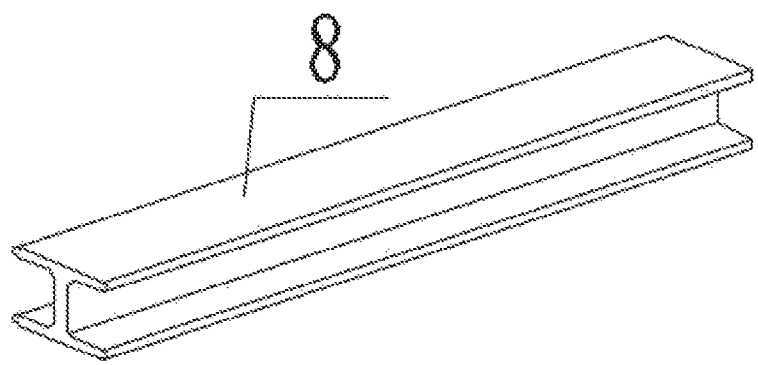
FIG. 8 is a structure view of a sliding track of the present invention.

A construction method of a rectangular working well with a preset pipe jacking hole and a sliding back wall in a water-rich stratum, comprising steps of: first designing functional requirements for the rectangular working well; constructing a maintenance structure and a temporary protector in sequence; excavating earthwork of the rectangular working well; forming a bottom cover for the rectangular working well, and pre-embedding a sliding track, a pull ring and a back wall anchor; installing a ladder for entering the rectangular working well; preventing joint leakage; installing a water-proof pressure plate at an entrance of the preset pipe jacking hole; constructing the sliding back wall; then using a hydraulic jacking thrust of pipe jacking equipment to penetrate a thin concrete wall having a cavity formed by lifting a sandwich concrete slab wall to safely perform pipe jacking, thereby complete construction of the rectangular working well with the preset pipe jacking hole and the sliding back wall in a water-rich stratum. Specifically, the construction method comprises steps of:

(I) designing functional requirements for the rectangular working well, comprising steps of:

(1) collecting relevant data to determine a plane size, a depth, and a treatment method of a working well bottom cover, so as to satisfy well operation requirements;

(2) determining a height and a diameter of the preset pipe jacking hole according to a position, a diameter, a material and a connection method of a proposed pipeline, wherein a quantity of the preset pip jacking hole is at least one; and (3) calculating and drawing a structure of the rectangular working well: using comparative calculation analysis of a rod system element method and numerical simulation to obtain an optimal supporting structure composition of the rectangular working well, and then drawing to complete functional requirement design for the rectangular working well;

(II) constructing a caisson of an enclosing structure of the rectangular working well, comprising steps of:

(1) preparing before construction of the caisson: comprising site leveling, laying out, excavating earth of a first layer, compacting a foundation, leveling and laying out, inspecting lines, laying a sand cushion, forming cutting edge formwork, binding steel bars, forming well body formwork, pouring concrete, curing, and demoulding;

(2) constructing the caisson by sections: comprising preparing, installing a vertical transportation machinery and drainage pumps, observing, correcting, sinking to a designed elevation by sections, and verifying the elevation;

(3) setting a thin concrete wall having a cavity along a vertical axis where the preset pipe jacking hole is located during pouring the caisson by sections, and inserting a sandwich concrete slab wall into the thin concrete wall having the cavity; and (4) using reinforced concrete or steel members as a material of the enclosing structure of the rectangular working well, and performing anticorrosive measures;

(III) constructing an edge protector: setting embedded parts during construction the caisson of the enclosing structure of the rectangular working well, and connecting the edge protector and the embedded parts by bolts;

(IV) excavating earthwork of the rectangular working well: during construction of the caisson, directly excavating the earthwork above water, and excavating the earthwork below the water by high-pressure water gun loosening, hydraulic grabbing or reverse circulation pumping;

(V) forming a bottom cover for the rectangular working well, and pre-embedding a sliding track, a pull ring and a back wall anchor: in order to meet needs of subsequent construction, using concrete to treat the bottom cover of the rectangular working well; using plain concrete for anti-floating stability before connecting a caisson wall with reinforced concrete; simultaneously pre-embedding the sliding track, the pull ring and the back wall anchor during pouring the reinforced concrete bottom cover;

(VI) installing a ladder for entering the rectangular working well: according to needs of subsequent maintenance, designing the ladder which is installed on an internal wall of the rectangular working well by planting bars;

(VII) preventing joint leakage: using a polymer material for leakage control at joints of the rectangular working well and side walls of the caisson of the enclosing structure;

(VIII) installing a water-proof pressure plate at an entrance of the preset pipe jacking hole: fixing the waterproof pressure plate at the entrance through expansion bolts according to a position of the preset pipe jacking hole;

(IX) constructing the sliding back wall: according to a calculation result of a pipe jacking thrust, hoisting a prefabricated back wall, and fixing the back wall by the back wall anchor; installing a pull rod between the back wall anchor and the pull ring; for different pipe jacking positions, adjusting a position of the sliding back wall through the pull rod and starting pipe jacking again after fixing;

(X) lifting the sandwich concrete slab wall at a top of the preset pipe jacking hole: lifting the sandwich concrete slab wall to form the thin concrete wall having the cavity at the preset pipe jacking hole, so as to reduce a resistance when a pipe jacking machinery passes through the preset pipe jacking hole; and (XI) performing pipe jacking: after the pipe jacking machinery is installed in place, continuously passing through the thin concrete wall having the cavity at the preset pipe jacking hole under a hydraulic jacking thrust for normal pipe jacking construction.

Mechanical requirements of two construction processes are both considered, and forces and structural functions of excavation support and pipe jacking calculated construction are considered simultaneously to avoid conflicts between excavation support and pipe jacking during construction.

A rectangular working well with a preset pipe jacking hole and a sliding back wall in a water-rich stratum comprises: the rectangular working well 1, wherein an enclosing structure of the rectangular working well 1 is a caisson 4, wherein a material of the enclosing structure is generally reinforced concrete. When steel members are used as the enclosing structure of the rectangular working well, anticorrosive measures should be taken in the water-rich stratum. A bottom cover 2 is provided at a bottom of the rectangular working well 1, and the preset jacking hole 3 is provided inside the rectangular working well 1 and near the bottom, wherein a position of the preset pipe jacking hole 3 is a position where a pipe jack is about to jack; the sliding back wall 14 is provided opposite to the preset jacking hole 3, a thin concrete wall having a cavity 16 is provided in the caisson 4 along a vertical axis of the preset jacking hole 3, and a sandwich concrete panel wall 5 is inserted into the thin concrete wall having the cavity 16. A pipe jacking machinery 17 is provided in the rectangular working well 1; the pipe jacking machinery 17 is docked with a pipe jacking 18 in a thrust direction, and the pipe jacking machinery 17 pushes the pipe jacking 18 toward the preset pipe jacking hole 3.

During pipe jacking, the sandwich concrete slab wall 5 is lifted, and the thin concrete wall having the cavity 16 at the preset pipe jacking hole 3 is penetrated by a hydraulic jacking thrust for pipe jacking. The sandwich concrete slab wall 5 is inserted into the thin concrete wall having the cavity 16 in the caisson. When the pipe jacking is not performed, the sandwich concrete slab wall 5 is applicable as a part of the enclosing structure of the rectangular working well. For pipe jacking, the sandwich concrete slab wall 5 is lifted, and the thin concrete wall having the cavity 16 is easily penetrated by the jacking thrust of the pipe jacking machinery, which facilitates the pipe jacking. Conventional working wells are all concrete structures, which is difficult to drill by a water drill, wherein a concrete surface must be secondary removed. During a removing process, safety hazards such as collapse and subsidence are likely to appear on the ground. After the sandwich concrete slab wall 5 is lifted, thin walls of the thin concrete wall having the cavity 16 can be easily penetrated, and the pipe jacking can be directly performed to avoid secondary destruction.

A sliding track 8 and a pull ring 9 are pre-embedded on the bottom cover 2; the sliding back wall 14 cooperates with the sliding track 8; the sliding back wall 14 is connected to a pull rod 15 through an anchor 10, and an end portion of the pull rod 15 is connected to the pull ring 9. When a pipe jacking device is pushed into the pipe jacking, a back of the pipe jacking device bears all the horizontal jacking thrust of the pipe jacking process. As a result, it is necessary to pour a concrete back wall at the back of the pipe jacking device in time to distribute the jacking thrust evenly on the back wall. The pour-in-place back wall is a one-time wall surface and requires setting period and curing time, which prolongs the construction period. After the pipe jacking, the back wall needs to be removed. However, in the present application, the sliding back wall 14 is a prefabricated part. During construction, the sliding back wall 14 is hoisted into the rectangular working well 1 and fixed by an anchor. When the rectangular working well 1 has multiple pipe jacking positions, a position of the sliding back wall 14 can be adjusted by the pull rod and the pipe jacking can be started again after fixing.

A ladder 11 is installed on an internal wall of the rectangular working well 1 through planting bars to facilitate subsequent use of the rectangular pipe jacking well.

A water-proof pressure plate 13 is fixed at an entrance of the preset pipe jacking hole 3 by expansion bolts. A polymer material 12 is used for leakage control at joints between the bottom cover 2 and the caisson 4 as well as joints at side walls of the caisson 4. Especially in water-rich stratum, it is possible to prevent permanent working wells from seeping water from holes and joints after long-term use.

A connector is pre-embedded on the caisson 4; an edge protector 6 is connected to a top end of the caisson 4, and the edge protector 6 is connected to the pre-embedded connector by bolts.

The present invention innovatively adopts a combined enclosing structure of the caisson, the sandwich concrete slab wall at the preset pipe jacking hole and the sliding back wall for advanced support of the rectangular working well. The present invention innovates the construction process and structural design, and uses the hydraulic jacking thrust of the pipe jacking equipment to directly penetrate the thin concrete wall having the cavity formed after lifting the sandwich concrete slab wall, so as to realize the safe and rapid forming of the preset pipe jacking hole. It is the first time to use the sliding back wall to meet subsequent construction requirements of single-well repeated pipe jacking, which can save investment and speed up the construction progress. According to the present invention, the rectangular working well with the preset pipe jacking hole and the sliding back wall in the water-rich stratum has many advantages such as clear function, safety, quickness, and flexible design. In particular, it overcomes the safety hazards such as water gushing and sand gushing during penetrating well walls by the pipe jacking in the water-rich stratum, which provides a new set of working well design and construction technology for non-excavation construction of underground pipelines for water conservancy, municipal, thermal, communication and other infrastructure. The present invention not only changes the conventional post-drilling construction method and avoids risks thereof, but also creatively proposes and adopts a synchronous design of the preset pipe jacking hole and the rectangular working well, enabling hydraulically penetrating the thin concrete wall having the cavity with the help of the pipe jacking equipment.

The above are only the preferred embodiments of the present invention. It should be noted that for those skilled in the art, several modifications and improvements can be made without departing from the overall concept of the present invention. These modifications and improvements should also fall into the protection scope of the present invention.

What is claimed is:

1. A construction method of a rectangular working well with a preset pipe jacking hole and a sliding back wall in a water-rich stratum, comprising steps of:
   (I) designing functional requirements for the rectangular working well, comprising steps of:
   (1) collecting relevant data to determine a plane size, a depth, and a treatment method of a working well bottom cover, so as to satisfy well operation requirements;
   (2) determining a height and a diameter of the preset pipe jacking hole according to a position, a diameter, a material and a connection method of a proposed pipeline, wherein a quantity of the preset pip jacking hole is at least one; and (3) calculating and drawing a structure of the rectangular working well: using comparative calculation analysis of a rod system element method and numerical simulation to obtain an optimal supporting structure composition of the rectangular working well, and then drawing to complete functional requirement design for the rectangular working well;

(II) constructing a caisson of an enclosing structure of the rectangular working well, comprising steps of:

(1) preparing before construction of the caisson: comprising site leveling, laying out, excavating earth of a first layer, compacting a foundation, leveling and laying out, inspecting lines, laying a sand cushion, forming cutting edge formwork, binding steel bars, forming well body formwork, pouring concrete, curing, and demoulding;

(2) constructing the caisson by sections: comprising preparing, installing a vertical transportation machinery and drainage pumps, observing, correcting, sinking to a designed elevation by sections, and verifying the elevation;

(3) setting a thin concrete wall having a cavity along a vertical axis where the preset pipe jacking hole is located during pouring the caisson by sections, and inserting a sandwich concrete slab wall into the thin concrete wall having the cavity; and (4) using reinforced concrete or steel members as a material of the enclosing structure of the rectangular working well, and performing anticorrosive measures;

(III) constructing an edge protector: setting embedded parts during construction the caisson of the enclosing structure of the rectangular working well, and connecting the edge protector and the embedded parts by bolts;

(IV) excavating earthwork of the rectangular working well: during construction of the caisson, directly excavating the earthwork above water, and excavating the earthwork below the water by high-pressure water gun loosening, hydraulic grabbing or reverse circulation pumping;

(V) forming a bottom cover for the rectangular working well, and pre-embedding a sliding track, a pull ring and a back wall anchor: in order to meet needs of subsequent construction, using concrete to treat the bottom cover of the rectangular working well; using plain concrete for anti-floating stability before connecting a caisson wall with reinforced concrete; simultaneously pre-embedding the sliding track, the pull ring and the back wall anchor during pouring the reinforced concrete bottom cover;

(VI) installing a ladder for entering the rectangular working well: according to needs of subsequent maintenance, designing the ladder which is installed on an internal wall of the rectangular working well by planting bars;

(VII) preventing joint leakage: using a polymer material for leakage control at joints of the rectangular working well and side walls of the caisson of the enclosing structure;

(VIII) installing a water-proof pressure plate at an entrance of the preset pipe jacking hole: fixing the water-proof pressure plate at the entrance through expansion bolts according to a position of the preset pipe jacking hole;

(IX) constructing the sliding back wall: according to a calculation result of a pipe jacking thrust, hoisting the sliding back wall, and fixing the sliding back wall by the back wall anchor; installing a pull rod between the back wall anchor and the pull ring; for different pipe jacking positions, adjusting a position of the sliding back wall through the pull rod and starting pipe jacking again after fixing;

(X) lifting the sandwich concrete slab wall at a top of the preset pipe jacking hole: lifting the sandwich concrete slab wall to form the thin concrete wall having the cavity at the preset pipe jacking hole, so as to reduce a resistance when a pipe jacking machinery passes through the preset pipe jacking hole; and (XI) performing pipe jacking: after the pipe jacking machinery is installed in place, continuously passing through the thin concrete wall having the cavity at the preset pipe jacking hole under a hydraulic jacking thrust for normal pipe jacking construction.

2. A rectangular working well with a preset pipe jacking hole and a sliding back wall in a water-rich stratum, comprising: the rectangular working well (1), wherein an enclosing structure of the rectangular working well (1) is a caisson (4), a bottom cover (2) is provided at a bottom of the rectangular working well (1), and the preset jacking hole (3) is provided inside the rectangular working well (1) and near the bottom; the sliding back wall (14) is provided opposite to the preset jacking hole (3), a thin concrete wall having a cavity (16) is provided in the caisson (4) along a vertical axis of the preset jacking hole (3), and a sandwich concrete panel wall (5) is inserted into the thin concrete wall having the cavity (16).

3. The rectangular working well, as recited in claim 2, wherein a water-proof pressure plate (13) is fixed at an entrance of the preset pipe jacking hole (3) by expansion bolts.

4. The rectangular working well, as recited in claim 2, wherein a pipe jacking machinery (17) is provided in the rectangular working well (1); the pipe jacking machinery (17) is docked with a pipe jacking (18) in a thrust direction, and the pipe jacking machinery (17) pushes the pipe jacking (18) toward the preset pipe jacking hole (3).

5. The rectangular working well, as recited in claim 2, wherein a polymer material (12) is used for leakage control at joints between the bottom cover (2) and the caisson (4) as well as joints at side walls of the caisson (4).

6. The rectangular working well, as recited in claim 2, wherein a connector is pre-embedded on the caisson (4); an edge protector (6) is connected to a top end of the caisson (4), and the edge protector (6) is connected to the pre-embedded connector by bolts.

7. The rectangular working well, as recited in claim 2, wherein a ladder (11) is installed on an internal wall of the rectangular working well (1) through planting bars.

8. The rectangular working well, as recited in claim 2, wherein a sliding track (8) and a pull ring (9) are pre-embedded on the bottom cover (2); the sliding back wall (14) cooperates with the sliding track (8); the sliding back wall (14) is connected to a pull rod (15) through an anchor (10), and an end portion of the pull rod (15) is connected to the pull ring (9).

\* \* \* \* \*